US008369050B2

(12) United States Patent
Barnhusen et al.

(10) Patent No.: US 8,369,050 B2
(45) Date of Patent: Feb. 5, 2013

(54) CIRCUIT FOR PROTECTING A DC NETWORK WITH DC LOADS AGAINST OVERVOLTAGE

(75) Inventors: Hartmut Barnhusen, Soest (DE); Paul Maiberg, Anröchte (DE)

(73) Assignee: AEG Power Solutions B.V., Zwanenburg (NL)

( * ) Notice: Subject to any disclaimer, the term of this patent is extended or adjusted under 35 U.S.C. 154(b) by 914 days.

(21) Appl. No.: 12/419,700

(22) Filed: Apr. 7, 2009

(65) Prior Publication Data

US 2009/0262469 A1    Oct. 22, 2009

(30) Foreign Application Priority Data

Apr. 21, 2008   (DE) .................... 10 2008 020 030

(51) Int. Cl.
   *H02H 3/20*   (2006.01)
(52) U.S. Cl. ......................................... 361/18; 361/91.1
(58) Field of Classification Search .................. 361/18, 361/91, 111, 91.1
   See application file for complete search history.

(56) References Cited

U.S. PATENT DOCUMENTS

| 4,181,932 A * | 1/1980 | Fujiwara ........................ 363/68 |
| 4,805,082 A * | 2/1989 | Heinrich et al. ............... 363/129 |
| 4,815,052 A * | 3/1989 | Walker ............................ 363/87 |
| 4,884,182 A * | 11/1989 | Ando et al. ..................... 363/37 |
| 5,615,097 A | 3/1997 | Cross |
| 6,055,167 A * | 4/2000 | Shamkovich et al. ........... 363/52 |
| 6,069,811 A * | 5/2000 | Moriguchi et al. ............. 363/142 |
| 2008/0007190 A1* | 1/2008 | Kunii et al. .................... 318/141 |

FOREIGN PATENT DOCUMENTS

| DE | 3504594 A1 | 10/1985 |
| DE | 4136731 A1 | 5/1993 |
| DE | 2549019 A1 | 5/1997 |
| WO | 9827641 A1 | 6/1998 |

OTHER PUBLICATIONS

German Search Report for related Application DE 10 2008 020 030.1 dated Oct. 8, 2012.

* cited by examiner

*Primary Examiner* — Danny Nguyen
(74) *Attorney, Agent, or Firm* — Norris McLaughlin & Marcus, P.A.; Christa Hildebrand

(57) ABSTRACT

A circuit (S) for protecting a DC network having DC loads (1) and connectable to the circuit (S), the circuit (S) is suitable and configured to supply the DC network with electric power via a three-phase rectifier (G) and wherein the circuit (S) includes a means (2, 3, 4, $TH_1$, $L_S$, $C_S$, $D_U$, $D_V$, $D_W$) for detecting an overvoltage, wherein the means is suitable and configured to detect an overvoltage at the input of the DC network, and the circuit (S) includes a means (2, 3, 4, $TH_1$, $L_S$, $C_S$, $D_U$, $D_V$, $D_W$) for transferring a current, wherein the means is suitable and configured to supply current to one or several current-carrying thyristors ($TH_{U1}$, $TH_{V1}$, $TH_{W1}$) of the rectifier (G), wherein the current causes the thyristor or thyristors ($TH_{U1}$, $TH_{V1}$, $TH_{W1}$) to turn off as soon as the detection means has detected an overvoltage.

25 Claims, 1 Drawing Sheet

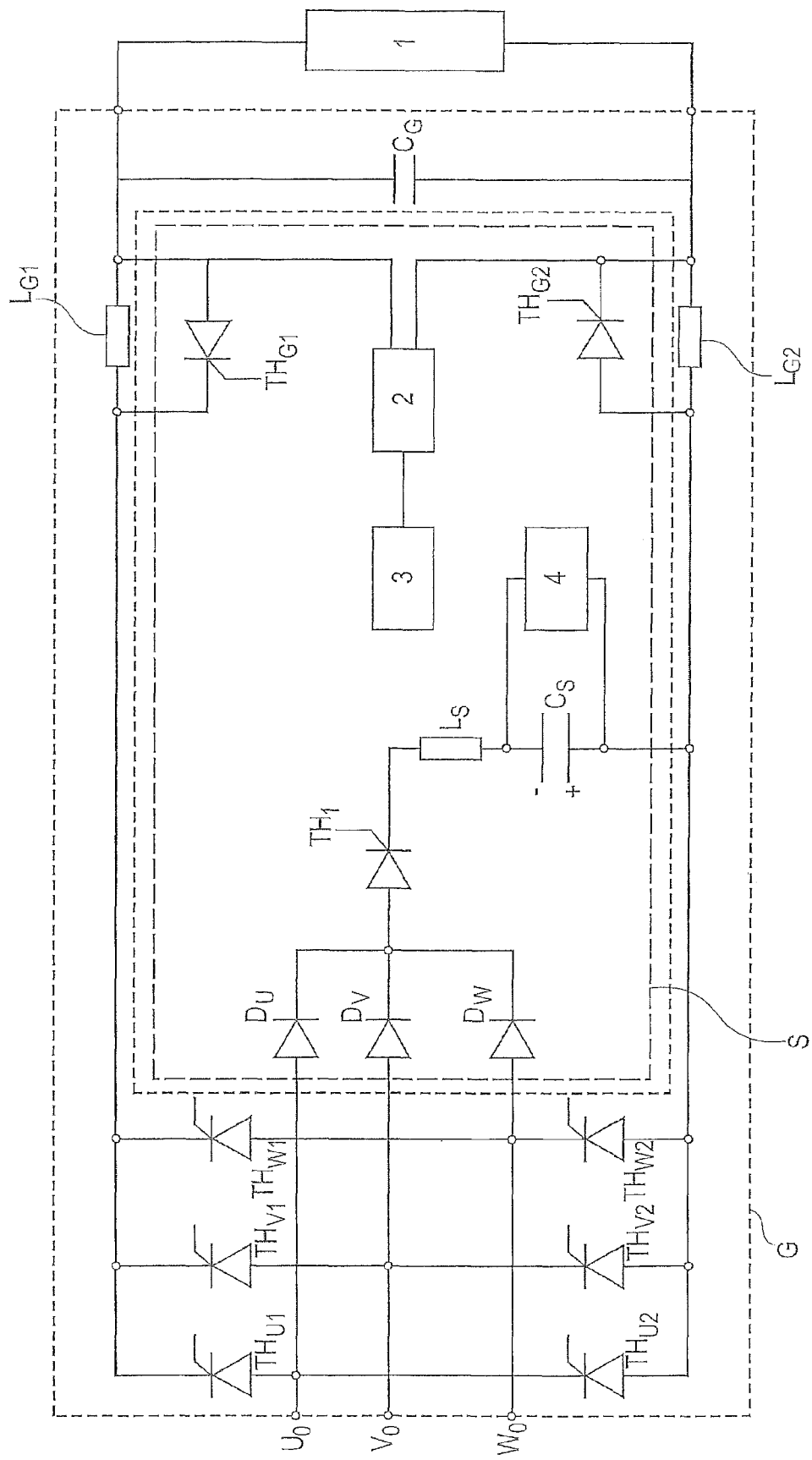

CIRCUIT FOR PROTECTING A DC NETWORK WITH DC LOADS AGAINST OVERVOLTAGE

BACKGROUND OF THE INVENTION (1) Field of the Invention

The present invention relates to a circuit for protecting at least one DC network with DC loads which are suitable and configured to be supplied with electrical power via a rectifier.

(2) Description of Related Art

DC networks having DC loads which are supplied with DC current via rectifiers, for example three-phase rectifiers, are known in the art, for example, from local networks of power plants. The DC loads in these local DC networks of the power plants can include DC loads related to the safe operation of the power plant. These may include, for example, sensors, field devices, display devices, display means, controllers and regulators, in particular for supplying uninterrupted power, a safety power supply, in particular a safety illumination, drives, in particular valve drives associated with a reactor vessel, and other DC loads. These electrical devices are implemented as DC devices, so that they can be easily supplied with electrical energy from an energy store, such as an accumulator or a battery. Under normal conditions, i.e., in error-free operation, these devices, such as the DC loads, are to be supplied with electrical energy generated by the power plant. The DC network with these DC loads is therefore connected by way of a rectifier to an AC voltage generated by the power plant.

However, it has been of observed in the past that these DC networks are inadequately protected against an overvoltage from the AC power grid. These overvoltages may damage the DC loads.

This may cause particularly controllers and regulators as well as sensors and actuators to fail.

Thus, there is a need to more adequately protect against an overvoltage from the AC power grid to avoid damage of the DC loads due to overvoltages.

BRIEF SUMMARY OF THE INVENTION

The present invention addresses this technical problem by proposing a circuit which is suitable and configured to protect a DC network having DC loads, which is supplied by way of a rectifier with an AC voltage from an AC power grid, against overvoltages originating precisely from this AC power grid.

A solution for this technical problem is recited in claim 1. A circuit according to the invention includes means for detecting an overvoltage, wherein the means is suitable and configured to identify an overvoltage at the input of the DC network or at the output of the rectifier, respectively. The circuit further includes transfer means for transferring a current from one or several current-carrying thyristors of a first group of thyristors of the rectifier, as soon as the means for detecting the overvoltage has detected an overvoltage, wherein transfer of the current forces the thyristor or thyristors of the first group to turn off.

According to the invention, the transfer means transfers in the event of an overvoltage, in particular in the event of a transient overvoltage, the current from the at least one current-carrying thyristor of the first group of thyristors. After the transfer means has transferred the current, i.e., after a commutation has taken place, the current through the previously current-carrying thyristor(s) of the first group of thyristors of the rectifier is equal to zero, forcing the thyristor to turn off.

The transfer means may include a first controllable switching element for switching a circuit via a current-carrying thyristor or several current-carrying thyristors of a second group of thyristors of the rectifier, which is closed when the controllable switching element is conducting.

The first controllable switching element may be a first thyristor.

The transfer means may include a voltage source an as energy store, which drives a current through the circuit closed by the first controllable switching element. The energy store may be a capacitor which is charged during operation. A charging means may be provided for this purpose. The capacitor is discharged when the circuit is closed by the first controlled switching element.

Advantageously, an inductor is connected in a series with the first controlled switching element and the capacitor, wherein the inductor causes a current reversal after the capacitor is discharged, thereby forcing the first controlled switching element to turn off.

In addition, both the capacitor and the inductor are used for limiting the current in the circuit closed by the first controlled switching element due to the overvoltage.

The transfer means may have a controller which is suitable and configured to trigger the first controllable switching element in the event of an overvoltage, causing it to close. The controller may also have a trigger pulse generator for generating a trigger pulse for the first thyristor.

The circuit of the invention may include discharge means for discharging inductors of the rectifier. The discharge means can be formed by second controllable switching elements, preferably likewise thyristors, which are arranged in a branch in parallel with the inductors. The second thyristors may be arranged in the reverse direction with respect to the load current. The second controllable switching elements may be configured so that the can be controllably closed by the controller of the transfer means in the event of an overvoltage. The second thyristors may in the event of an overvoltage also receive a trigger pulse from the trigger pulse generator of the controller, thereby closing the circuit via the thyristors.

A first terminal of the capacitor, which is charged during operation so as to be able to supply the current in the event of an overvoltage, can be connected to the negative terminal of the rectifier. A second terminal of the capacitor is advantageously at least indirectly connected to the anode of the first thyristor.

The anode of the first thyristor may be configured for connection to each of the input phases via a corresponding diode. An inductor may be connected between the capacitor and the thyristor.

A circuit of this type may be interconnected with a rectifier and a DC network so as to form a circuit arrangement, wherein the DC network includes DC loads which are supplied with electric power via the rectifier.

The DC network may be a network inside a power plant. The network may be a local network of a power plant. Sensors, field devices, display devices, display means, controllers and regulators, in particular for supplying uninterrupted power, a safety power supply, in particular a safety illumination, drives, in particular valve drives associated with a reactor vessel, and other DC loads affecting the safety of the power plant may be supplied from the network. A circuit according to the invention can be used in a power plant in a local network connected to a rectifier for protecting DC loads affecting the safety of the power plant.

Additional features and advantages of the present invention will become clearer based on the following description of a preferred exemplary embodiment.

BRIEF DESCRIPTION OF THE SEVERAL VIEWS OF THE DRAWING(S)

FIG. 1 shows the circuit diagram of a circuit according to the invention.

DETAILED DESCRIPTION OF THE INVENTION

The circuit arrangement illustrated in FIG. 1 includes a three-phase rectifier G, the circuit S of the invention, and a DC load 1.

The three-phase rectifier G is constructed in a conventional manner and has three terminals for connecting the three-phase rectifier to the phases $U_0$, $V_0$, $W_0$ of a three-phase power supply. Each terminal is connected to two thyristors $TH_{U1}$, $TH_{U2}$; $TH_{V1}$, $TH_{V2}$; $TH_{W1}$, $TH_{W2}$, namely once to the cathode and once to the anode of the corresponding thyristors $TH_{U1}$, $TH_{U2}$; $TH_{V1}$, $TH_{V2}$; $TH_{W1}$, $TH_{W2}$. The thyristors $TH_{U1}$, $TH_{V1}$, $TH_{W1}$, which are connected to the phases $U_0$, $V_0$, $W_0$ with their cathodes, form a first group of thyristors of the rectifier, and thyristors $TH_{U2}$, $THV_2$, $TH_{W2}$, which are connected to the phases $U_0$, $V_0$, $W_0$ with their cathodes, form a second group of thyristors of a controlled six-pulse bridge circuit (B6C). The anodes of the thyristors $TH_{U1}$, $TH_{V1}$, $TH_{W1}$ of the first group are connected to the positive potential of the six-pulse bridge circuit. The cathodes of the thyristors $TH_{U2}$, $TH_{V2}$, $TH_{W2}$ of the second group are connected to the negative potential of the six-pulse bridge circuit.

The positive potential and the negative potential of the six-pulse bridge circuit are connected with one another by way of a smoothing capacitor $C_G$.

An inductor $L_{G1}$ is connected between the positive potential of the six-pulse bridge circuit and the terminal of the output of the three-phase rectifier connected to positive potential, and an inductor $L_{G2}$ is connected between the negative potential of the six-pulse bridge circuit and the terminal of the output of the three-phase rectifier that is connected to the negative potential. The load 1 is connected to the output.

Up to this point, the circuit arrangement is conventional.

With this circuit arrangement, however, the three-phase rectifier G can disadvantageously transmit an overvoltage to the load 1 if the AC power grid produces an overvoltage, in particular a transient overvoltage. Such overvoltage in the DC network can to destroy the connected loads. The circuit S of the invention obviates this deficiency.

The circuit S of the invention has detection means 2 for detecting an overvoltage at the DC side of the three-phase rectifier G, i.e., at the output of the three-phase rectifier G. The detection means 2 is triggered as soon as the voltage between the two terminals forming the output of the three-phase rectifier G exceeds a predetermined threshold value.

When the detection means 2 has detected an overvoltage at the DC side of the three-phase rectifier G, a means 2, 3, 4, $TH_1$, $L_S$, $C_S$, $D_U$, $D_V$, $D_W$ for transferring a current is triggered, which is suitable and configured to transfer the current from one or several of the current-carrying thyristors of the first group of the three-phase rectifier, thereby forcing the thyristor(s) of the first group and hence the load current to turn off.

The means 2, 3, 4, $TH_1$, $L_S$, $C_S$, $D_U$, $D_V$, $D_W$ for transferring the current includes a capacitor $C_S$ which is charged by a charging means 4 during operation of the three-phase rectifier G.

The capacitor is connected in series with a first thyristor $TH_1$ and an inductor $L_S$.

The positive terminal of the capacitor is permanently connected to the negative potential of the six-pulse bridge circuit.

The negative terminal of the capacitor $C_S$ is connected via the inductor $L_S$ to a cathode of the first thyristor $TH_1$ of the transfer means. The anode of the first thyristor $TH_1$ is connected to a respective cathode of diodes $D_U$, $D_V$, $D_W$, whereas the anodes of diodes $D_U$, $D_V$, $D_W$ are connected to the terminals $U_0$, $V_0$, $W_0$ of the rectifier G.

During error-free operation, the first thyristor $TH_1$ is blocked, preventing current flow through the circuit formed of the capacitor $C_S$, the inductor $L_S$ and the first thyristor $TH_1$. However, if the overvoltage detection means detect an overvoltage, a signal is generated which causes a controller 3, which controls the means 2, 3, 4, $TH_1$, $L_S$, $C_S$, $D_U$, $D_V$, $D_W$ for transferring the current, to trigger the thyristor $TH_1$. To this end, the controller 3 includes a trigger pulse generator.

When the thyristor $TH_1$ is triggered, the capacitor $C_S$ can discharge via the just connected circuit, which includes the capacitor $C_S$, the inductor $L_S$ and the first thyristor $TH_1$. The current then flows from positive terminal of the capacitor via at least one of the thyristors $TH_{U2}$, $TH_{V2}$, $TH_{W2}$ of the second group of the six-pulse bridge circuit, one of the diodes $D_U$, $D_V$, $D_W$ to the thyristor $TH_1$, continuing from the thyristor $TH_1$ via the inductor $L_S$ to the negative terminal of the capacitor $C_S$.

This just closed circuit also causes the current through at least one of the thyristors ($TH_{U1}$, $TH_{V1}$, $TH_{W1}$) of the first group to commutate to the just closed circuit. The just closed circuit is dimensioned that the entire current through the thyristors ($TH_{U1}$, $TH_{V1}$, $TH_{W1}$) of the first group which previously carried the current becomes zero. The current from the highest potential of the phases $U_0$, $V_0$, $W_0$ to the lowest potential of the phases $U_0$, $V_0$, $W_0$ at input of the six-pulse bridge circuit also flows through the newly closed circuit until the capacitor $C_S$ is discharged and the current of the capacitor $C_S$ begins to reverse, thereby forcing the first thyristor $TH_1$ to turn off.

The circuit S of the invention also includes two thyristors $TH_{G1}$, $TH_{G2}$ which are connected in parallel with the inductors $L_{G1}$, $L_{G2}$ of the rectifier G. The second thyristors $TH_{G1}$, $TH_{G2}$ are connected in the reverse direction of the current flowing through the load. In error-free operation, the two thyristors $TH_{G1}$, $TH_{G2}$ are not triggered, thus preventing current flow through the second thyristors $TH_{G1}$, $TH_{G2}$.

In the event of an overvoltage, the inductors $L_{G1}$, $L_{G2}$ may cause continued current flow through the load, with current flow through the smoothing capacitor $C_G$ of the rectifier increasing the output voltage of the rectifier. This can be prevented by arranging each of the second thyristors $TH_{G1}$, $TH_{G2}$ in a corresponding free-wheeling branch for the inductors $L_{G1}$, $L_{G2}$. In the event of an overvoltage, the second thyristors $TH_{G1}$, $TH_{G2}$ are triggered by the controller 3, thereby allowing the inductors $L_{G1}$, $L_{G2}$ to discharge through the second thyristors $TH_{G1}$, $TH_{G2}$.

The controller is configured so that the first thyristor $TH_1$ and the second thyristors $Th_{G1}$, $TH_{G2}$ are triggered simultaneously, as soon as the detection means 2 detects an overvoltage. The forced turn-off of the current-carrying thyristors of the first group then interrupts the load current. Only the current flow through the second thyristors $TH_{G1}$, $TH_{G2}$ can be initially maintained, as long as the inductors $L_{G1}$, $L_{G2}$ enable current flow through the second thyristors.

What is claimed:

1. A circuit (S) for protecting at least one DC network with DC loads (1) connectable to the circuit (S), wherein the circuit (S) is suitable and configured to supply the DC network with electric energy from a single-phase or multi-phase AC power grid via a rectifier (G), to protect the DC network against overvoltages from the AC power grid, comprising the circuit (S) includes means ($2, 3, 4, TH_1, L_S, C_S, D_U, D_V, D_W$) for detecting an overvoltage, which is suitable and configured to detect an overvoltage at the input of the DC network, the circuit (S) includes means ($2, 3, 4, TH_1, L_S, C_S, D_U, D_V, D_W$) for transferring the current from one or several current-carrying thyristors ($TH_{U1}, TH_{V1}, T_{W1}$) of a first group of thyristors ($TH_{U1}, TH_{V1}, TH_{W1}$) of the rectifier (G), as soon as the means for detecting the overvoltage has detected an overvoltage, wherein transfer of the current forces the thyristor or thyristors ($TH_{U1}, TH_{V1}, TH_{W1}$) of the first group to turn off.

2. The circuit (S) according to claim 1, wherein the means ($2, 3, 4, TH_1, L_S, C_S, D_U, D_V, D_W$) for transferring the current comprises an energy store ($C_S$) forming a voltage source.

3. The circuit (S) according to claim 2, wherein the energy store is a capacitor ($C_S$) which can be charged with a DC voltage during operation.

4. The circuit (S) according to claim 2, wherein the means ($2, 3, 4, TH_1, L_S, C_S, D_U, D_V, D_W$) for transferring the current comprises a first controllable switching element ($TH_1$) for switching a circuit via the energy store ($C_S$) and one or several current-carrying thyristors ($TH_{U2}, TH_{V2}, TH_{W2}$) of a second group of thyristors ($TH_{U2}, TH_{V2}, TH_{W2}$) of the rectifier.

5. The circuit (S) according to claim 4, wherein the first controllable switching element is a first thyristor ($TH_1$).

6. The circuit (S) according to claim 2, wherein the voltage source drives a current via the circuit that is switched by the first controllable switching element and prevents the thyristor ($TH_{U2}, TH_{V2}, TH_{W2}$) or the thyristors ($TH_{U2}, TH_{V2}, TH_{W2}$) of a second group of thyristors ($TH_{U2}, TH_{V2}, TH_{W2}$) of the rectifier from turning off.

7. The circuit (S) according to claim 5, wherein the means ($2, 3, 4, TH_1, L_S, C_S, D_U, D_V, D_W$) for transferring the current comprise a controller (3) which is suitable and configured to controllably close the first controllable switching element ($TH_1$) in the event of an overvoltage.

8. The circuit (S) according to claim 6, wherein the controller (3) comprises at least one trigger pulse generator which is configured to generate a trigger pulse for the first thyristor ($TH_1$).

9. The circuit (S) according to claim 1, wherein the circuit (S) comprises discharge means ($TH_{G1}, TH_{G2}$) for discharging inductors ($L_{G1}, L_{G2}$) of the three-phase rectifier (G).

10. The circuit (S) according to claim 9, wherein the discharge means are formed by second controllable switching elements ($TH_{G1}, TH_{G2}$) which are connected in a branch in parallel with the inductors ($L_{G1}, L_{G2}$).

11. The circuit (S) according to claim 10, wherein the second controllable switching elements are second thyristors ($TH_{G1}, TH_{G2}$) connected in the reverse direction to the load current.

12. The circuit (S) according to claim 10, wherein the second controllable switching elements ($TH_{G1}, TH_{G2}$) are configured to be controllably closed in the event of an overvoltage by the controller (3) of the means ($2, 3, 4, TH_1, L_S, C_S, D_U, D_V, D_W$) for transferring the current.

13. The circuit (S) according to claim 11, wherein, in the event of an overvoltage, the second thyristors ($TH_{G1}, T_{G2}$) receive a trigger pulse from the trigger pulse generator of the controller (3).

14. The circuit (S) according to claim 4, wherein the capacitor ($C_S$) is connected to the negative terminal of the rectifier (G).

15. The circuit (S) according to claim 14, wherein, the capacitor ($C_S$) is at least indirectly connected with the cathode of the first thyristor ($TH_1$).

16. The circuit (S) according to claim 15, wherein the first thyristor ($TH_1$) is configured so that its anode can be connected to each of the three phases via a corresponding diode ($D_U, D_V, D_W$).

17. The circuit (S) according to claim 15, wherein an inductor is connected between the capacitor ($C_S$) and the first thyristor ($TH_1$).

18. The circuit (S) according to claim 1, wherein the DC network is a network inside a power plant.

19. The circuit (S) according to claim 18, wherein the network is a local power grid of the power plant.

20. The circuit (S) according to claim 19, wherein the DC loads comprise: powers sensors, field devices, display devices, display means, controllers and regulators, a safety power supply, drives, and DC loads affecting the safety of the power plant.

21. The circuit (S) according to claim 4, wherein the voltage source drives a current via the circuit that is switched by the first controllable switching element and prevents the thyristor ($TH_{U2}, TH_{V2}, TH_{W2}$) or the thyristors ($TH_{U2}, TH_{W2}$) of a second group of thyristors ($TH_{U2}, TH_{V2}, TH_{W2}$) of the rectifier from turning off.

22. The circuit (S) according to claim 8, wherein the circuit (8) comprises discharge means ($TH_{G1}, TH_{G2}$) for discharging inductors ($L_{G1}, L_{G2}$) of the three-phase rectifier (G).

23. The circuit (S) according to claim 20, wherein the regulators is for supplying uninterrupted power.

24. The circuit (S) according to claim 20, wherein the safety power supply, is a safety illumination.

25. The circuit (S) according to claim 20, wherein the drives are valve drives associated with a reactor vessel.

* * * * *